(12) United States Patent
Pacella

(10) Patent No.: US 8,032,572 B2
(45) Date of Patent: *Oct. 4, 2011

(54) PERSONAL INVENTORY MANAGER

(75) Inventor: Dante J. Pacella, Charles Town, WV (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 368 days.

This patent is subject to a terminal disclaimer.

(21) Appl. No.: 11/961,003

(22) Filed: Dec. 20, 2007

(65) Prior Publication Data

US 2009/0164421 A1 Jun. 25, 2009

(51) Int. Cl.
*G06F 17/30* (2006.01)
(52) U.S. Cl. ...... 707/899; 707/949; 705/28; 235/472.01
(58) Field of Classification Search .................. 707/899, 707/949; 705/28; 235/472.01
See application file for complete search history.

(56) References Cited

U.S. PATENT DOCUMENTS

| 6,851,611 | B1* | 2/2005 | Shaw-Sinclair | 235/472.01 |
| 7,720,723 | B2* | 5/2010 | Dicker et al. | 705/27 |
| 2005/0197825 | A1* | 9/2005 | Hagerman et al. | 704/2 |
| 2008/0065514 | A1* | 3/2008 | Eaton | 705/27 |

OTHER PUBLICATIONS

Readerware, Readerware Corporation, Copyright 1999-2005, pp. 1-43, <http://web.archive.org/web/20060101030652/http://www.readerware.com/index.html>.*
Readerware, Readerware Corporation, Copyright 1999-2005, pp. 1-51, <http://web.archive.org/web/20060101030652/http://www.readerware.com/index.html>.*

* cited by examiner

*Primary Examiner* — Hung Q Pham

(57) ABSTRACT

A device retrieves information associated with personal inventory from a personal inventory database, and provides for display of an input personal inventory option, a search personal inventory option, and a search loaned personal inventory option based on the retrieved personal inventory information. The device further receives selection of one of the input personal inventory option, the search personal inventory option, or the search loaned personal inventory option, and receives information associated with a new personal inventory item when the input personal inventory option is selected. The device also provides for display of search personal inventory information when the search personal inventory option is selection, and provides for display of search loaned personal inventory information when the search loaned personal inventory option is selected.

21 Claims, 19 Drawing Sheets

| Type | Title | Creator | Date Information | Company | Duration | Misc. | Images |
|---|---|---|---|---|---|---|---|
| DVD | Title | Director | Release date | Movie studio | Minutes | Actors | Cover |
| Book | Title | Author | Publish date | Publisher | Pages | Character | Cover |
| CD | Title | Band | Release date | Label | Minutes | Song list | Cover |
| Video Game | Title | Game Co. | Release date | Game Co. | Size | Character | Box art |

FIG. 5

| Media | Checkout Date | Checkin Date | Length | Borrower Name | Images | Title | Loan Status |
|---|---|---|---|---|---|---|---|
| DVD | Nov. 1, 2007 | Nov. 15, 2007 | 2 hrs. | Joe | Cover | Title | N/A |
| Book | Oct. 1, 2007 | Not returned | 50 pgs. | Amy | Cover | Title | Problem |
| CD | Nov. 16, 2007 | Nov. 30, 2007 | 1 hr. | Tom | Cover | Title | N/A |
| Video Game | Oct. 11, 2007 | Oct. 30, 2007 | N/A | Fred | Box art | Title | N/A |

| MANUAL ENTRY OF NEW PERSONAL INVENTORY ITEM | |
|---|---|
| *Enter information for new personal inventory:* | |
| Type: | 710 |
| Title: | 720 |
| Creator: | 730 |
| Date: | 740 |
| Company: | 750 |
| Duration: | 760 |
| Misc.: | 770 |
| Images: | 780 |
| STORE ITEM IN DATABASE | 790 |

```
NEW PERSONAL INVENTORY ITEM SCAN
Type: DVD  ~1010
Title: Movie title  ~1020
Creator: Director  ~1030
Date: Release date  ~1040
Company: Movie Studio  ~1050
Duration: 2 hours  ~1060
Misc.: Actors  ~1070
Images: Cover image  ~1080
[ STORE ITEM IN DATABASE ] ~1090
```

SEARCH PERSONAL INVENTORY

*Please select means to search personal inventory:*

By media type ◀ ▼—1110

By title ▼—1120

By genre ▼—1130

By personal rating ▼—1140

By industry rating ▼—1150

By author / director ▼—1160

By series ▼—1170

| | | | | | |
|---|---|---|---|---|---|
| PERSONAL INVENTORY BY MEDIA TYPE | | | | | |
| 1210 | 1220 | 1230 | 1240 | 1250 | 1260 |
| Type | Title | Creator | Date | Company | Images |
| CD 1 | Title 1 | Band 1 | Release date | Label 1 | Cover 1 |
| CD 2 | Title 2 | Band 2 | Release date | Label 2 | Cover 2 |
| CD 3 | Title 3 | Band 3 | Release date | Label 3 | Cover 3 |
| CD 4 | Title 4 | Band 4 | Release date | Label 4 | Cover 4 |

SEARCH LOANED PERSONAL INVENTORY

*Please select means to search loaned personal inventory:*

By media type ◀ ▼—1310

By borrower ▼—1320

By title ▼—1330

By longest outstanding loan ▼—1340

| LOANED PERSONAL INVENTORY BY MEDIA TYPE | | | | |
|---|---|---|---|---|
| Media | Checkout Date | Checkin Date | Title | Borrower |
| DVD 1 | Nov. 1, 2007 | Dec. 1, 2007 | Title 1 | Fred |
| DVD 2 | Oct. 1, 2007 | Nov. 1, 2007 | Title 2 | John |
| DVD 3 | Dec. 1, 2007 | Not returned | Title 3 | Paul |
| DVD 4 | Sep. 1, 2007 | Oct. 1, 2007 | Title 4 | Glenn |

Columns: 1410, 1420, 1430, 1440, 1450

PERSONAL INVENTORY MANAGER

BACKGROUND

Today, there are desktop-based databases that store information associated with digital video discs (DVDs), compact discs (CDs), books, video games, etc. For example, one desktop application permits users to create visual on-screen representations of their personal collections of books, CDs, movies and video games. The desktop application also displays images of the items on virtual shelves and pulls information from online databases to display detailed product descriptions.

BRIEF DESCRIPTION OF THE DRAWINGS

FIGS. 4 and 5 depict exemplary portions of personal inventory databases capable of being provided in the user device and/or the personal inventory server of the network illustrated in FIG. 1;

FIG. 7 depicts an exemplary user interface capable of being displayed by the user device of the network illustrated in FIG. 1, and displaying manual entry of a new personal inventory item;

FIG. 10 illustrates an exemplary user interface capable of being displayed by the user device of the network depicted in FIG. 1, and displaying a new personal inventory item scan;

FIGS. 11-14 illustrate exemplary user interfaces capable of being displayed by the user device of the network depicted in FIG. 1.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may permit input of, manage, and track personal inventory items (e.g., DVDs, books, CDs, etc.) using a user device (e.g., a cellular telephone, a personal digital assistant (PDA), other handheld electronic devices, etc.). The personal inventory may be recorded in a personal inventory database that may include user-definable information associated with the personal inventory (e.g., media type, title, creator, date, duration, etc.). The user or customer may search the user-definable information using a display of the user device, and may input information associated with new personal inventory items to be recorded in the personal inventory database. The customer may use the personal inventory information contained in the personal inventory database to prevent duplicate purchases at point-of-purchase locations (e.g., a customer at a movie store may determine if they already purchased a DVD by searching the personal inventory database). The personal inventory manager and/or database may also be used to track loaned personal inventory (e.g., a CD loaned to a friend, a family member, etc.) to determine who has what personal inventory and for how long. The personal inventory manager and/or database may provide a user with "at-a-glance" information about their personal inventory from the convenience of a hand-held device, such as a cellular phone.

As used herein, the terms "customer" and/or "user" may be used interchangeably. Also, the terms "customer" and/or "user" are intended to be broadly interpreted to include a user device or a user of a user device.

The term "personal inventory," as used herein, is to be broadly interpreted to include any product (e.g., any thing that may be marketed or sold as a commodity or a good) that may be tracked, managed, etc. by a user. For example, personal inventory may include DVDs, CDs, books, video tapes, video games, magazines, periodicals, etc.

Figure 1:
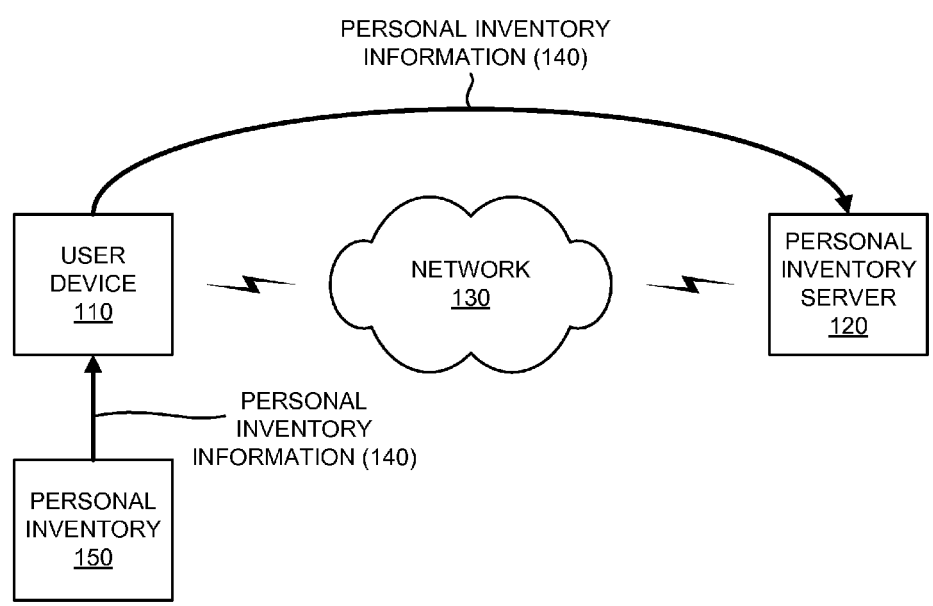
FIG. 1 is an exemplary diagram of a network in which systems and methods described herein may be implemented.

FIG. 1 is an exemplary diagram of a network 100 in which systems and methods described herein may be implemented. As illustrated, network 100 may include a user device 110 and/or a personal inventory server 120 interconnected by a network 130. User device 110 and/or personal inventory server 120 may connect to network 130 via wired and/or wireless connections. A single user device, personal inventory server, and network have been illustrated in FIG. 1 for simplicity. In practice, there may be more or less user devices, personal inventory servers, and/or networks. Also, in some instances, one or more of user device 110 and/or personal inventory server 120 may perform one or more functions described as being performed by another one or more of user device 110 and/or personal inventory server 120.

User device 110 may include any device capable of receiving and/or capturing information associated with personal inventory items. For example, user device 110 may include a mobile communication device (e.g., a radiotelephone, a personal communications system (PCS) terminal that may combine a cellular radiotelephone with data processing, a facsimile, and data communications capabilities, a PDA that can include a radiotelephone, pager, Internet/intranet access, web browser, organizer, camera, a Doppler receiver, and/or global positioning system (GPS) receiver, a GPS device, a telephone, a cellular telephone, etc.); a laptop; a personal computer; a pager; a camera (e.g., a conventional film camera or a digital camera); a video camera (e.g., a camcorder); a calculator; binoculars with a camera function; a telescope with a camera function; a gaming unit; any other device capable of utilizing a camera; a thread or process running on one of these devices; and/or an object executable by one of these devices. In one exemplary implementation, user device 110 may include a mobile payment service that permits a user to use user device 110 (e.g., a cellular phone) as a credit card (e.g., which may be referred to as "cell phone as credit card"). Further details of user device 110 are provided below in connection with FIGS. 2 and 3.

As used herein, a "camera" may include a device that may receive, capture, and store images and/or video. For example, a digital camera may be an electronic device that may capture and store images and/or video electronically instead of using photographic film. A digital camera may be multifunctional, with some devices capable of recording sound and/or video, as well as images.

Personal inventory server 120 may include one or more server entities, or other types of computation or communication devices, that gather, process, search, and/or provide information in a manner described herein. In one implementation, personal inventory server 120 may include a server (e.g., a computer system or an application) that stores a personal inventory database that may include user-definable information associated with personal inventory items (e.g., media type, title, creator, date, duration, etc.).

Network 130 may include a local area network (LAN), a wide area network (WAN), a metropolitan area network (MAN), an intranet, the Internet, a Public Land Mobile Network (PLMN), a telephone network, such as the Public Switched Telephone Network (PSTN) or a cellular telephone network (e.g., wireless Global System for Mobile Communications (GSM), wireless Code Division Multiple Access (CDMA), etc.), a VoIP network with mobile and/or fixed locations, a wireline network, or a combination of networks.

As further shown in FIG. 1, user device 110 may receive personal inventory information 140 associated with personal inventory 150 (e.g., personal inventory to be tracked by a user of user device 110). For example, in one implementation, user device 110 may receive personal inventory information 140 by capturing a barcode associated with personal inventory 150. Further details of capturing a barcode with user device 110 are provided below in connection with FIG. 8. In another implementation, a user of user device 110 may manually input personal inventory information 140. For example, the user may input personal inventory information 140, such as a type of personal inventory 150, a title of personal inventory 150, a creator of personal inventory 150, a date of personal inventory 150, a duration of personal inventory 150, etc. Personal inventory information 140 may be stored in a personal inventory database provided in user device 110, and/or may be forwarded by user device 110 (e.g., via network 130) to a personal inventory database provided in personal inventory server 120. Further details of the personal inventory database are provided below in connection with FIGS. 4 and 5.

In one implementation, the information contained in the personal inventory database may be synchronized across multiple user devices 110. For example, a user or group of users may own multiple user devices 110 (e.g., a husband may own a PDA, a wife may own a cellular phone, etc.), and may want to synchronize the personal inventory information from the personal inventory database across the multiple user devices 110. Alternatively, a user may purchase a new or replacement user device 110, and may wish to retain the personal inventory information. In such scenarios, the multiple user devices 110 may access the information contained in the personal inventory database from personal inventory server 120, and/or may store the information locally in the user devices 110. Thus, the multiple user devices 110 (e.g., regardless of their configurations) may have concurrent access to the information contained in the personal inventory database. Alternatively, and/or additionally, personal inventory server 120 may provide a query to the multiple user devices 110 to determine if the multiple user devices include the personal inventory information (e.g., the most recent or updated information contained in the personal inventory database). If one or more user devices 110 need updated personal inventory information, personal inventory server 120 may provide the updated information to user devices 110.

The user of user device 110 may access personal inventory information 140 from the personal inventory database, and user device 110 may display selectable options associated with the personal inventory database. For example, user device 110 may display an input personal inventory option, a search personal inventory option, a search loaned personal inventory option, etc. If the user selects the input personal inventory option, user device 110 may display information requesting manual entry of a new personal inventory item (or scanning of a barcode), may receive information associated with the new personal inventory item, and may store the new personal inventory item information in the personal inventory database. If the user selects the search personal inventory option, user device 110 may display selectable options for searching the personal inventory information (e.g., searching the personal inventory based on media type, title, genre, personal rating, industry rating, etc.). For example, user device 110 may enable the user to search the personal inventory information based on a media type (e.g., a CD), and user device 110 may display a list of CDs and associated information. If the user selects the search loaned personal inventory option, user device 110 may display selectable options for searching the loaned personal inventory information (e.g., searching the loaned personal inventory based on media type, person who borrowed the personal inventory, title, longest outstanding loan, etc.).

Figure 2:
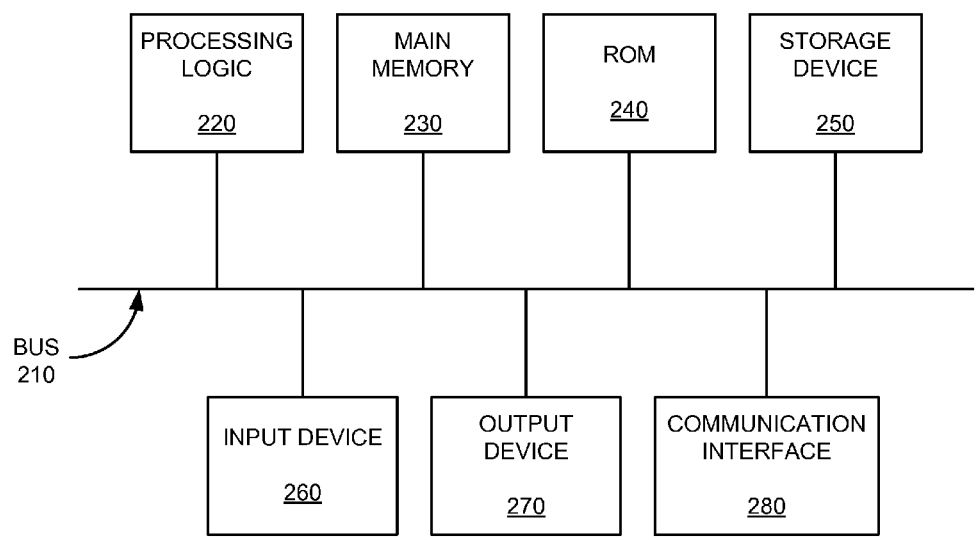
FIG. 2 illustrates exemplary components of a user device and/or a personal inventory server of the network depicted in FIG. 1.

FIG. 2 is an exemplary diagram of a device 200 that may correspond to user device 110 and/or personal inventory server 120. As illustrated, device 200 may include a bus 210, processing logic 220, a main memory 230, a read-only memory (ROM) 240, a storage device 250, an input device 260, an output device 270, and/or a communication interface 280. Bus 210 may include a path that permits communication among the components of device 200.

Processing logic 220 may include a processor, microprocessor, or other type of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 130.

As described herein, device 200 may perform certain operations in response to processing logic 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing logic 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
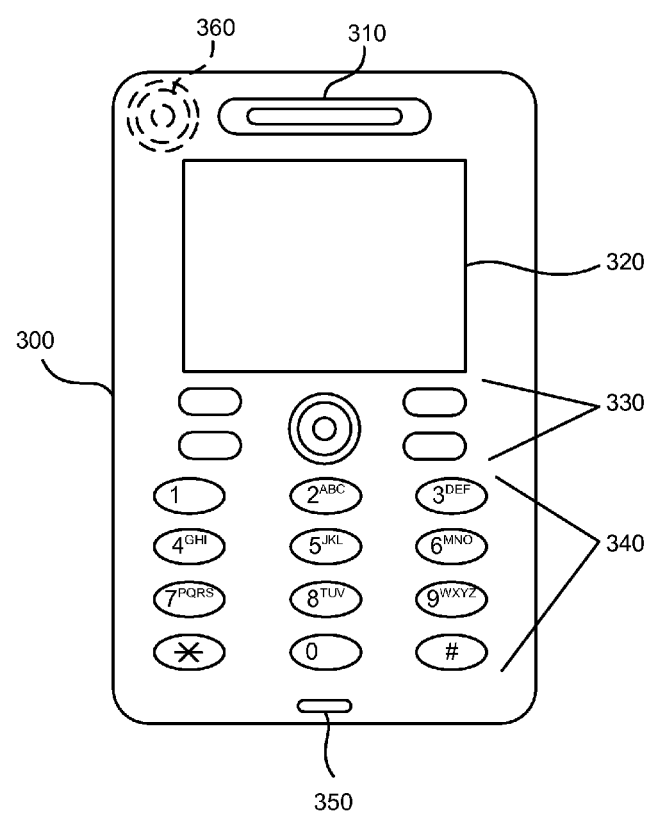
FIG. 3 depicts an exemplary diagram of the user device of the network illustrated in FIG. 1.

FIG. 3 is an exemplary diagram of user device 110. As illustrated, user device 110 may include a housing 300, a speaker 310, a display 320, control buttons 330, a keypad 340, a microphone 350, and/or a camera 360. Housing 300 may protect the components of user device 110 from outside elements. Speaker 310 may provide audible information to a user of user device 110.

Display 320 may provide visual information to the user. For example, display 320 may display text input into user device 110, text, images, video, and/or graphics received from another device, and/or information regarding incoming or outgoing calls or text messages, emails, media, games, phone books, address books, the current time, etc. In one exemplary implementation, display 320 may act as a viewfinder that may aid user device 110 in capturing and/or storing videos and/or images. Control buttons 330 may permit the user to interact with user device 110 to cause user device 110 to perform one or more operations. For example, control buttons 330 may be used to cause user device 110 to transmit information. Keypad 340 may include a standard telephone keypad. Microphone 350 may receive audible information from the user. Camera 360 may be provided on a front or back side of user device 110, and may enable user device 110 to capture and/or store video and/or images (e.g., pictures).

Although FIG. 3 shows exemplary components of user device 110, in other implementations, user device 110 may contain fewer, different, or additional components than depicted in FIG. 3. In still other implementations, one or more components of user device 110 may perform one or more other tasks described as being performed by one or more other components of user device 110.

Figure 4:
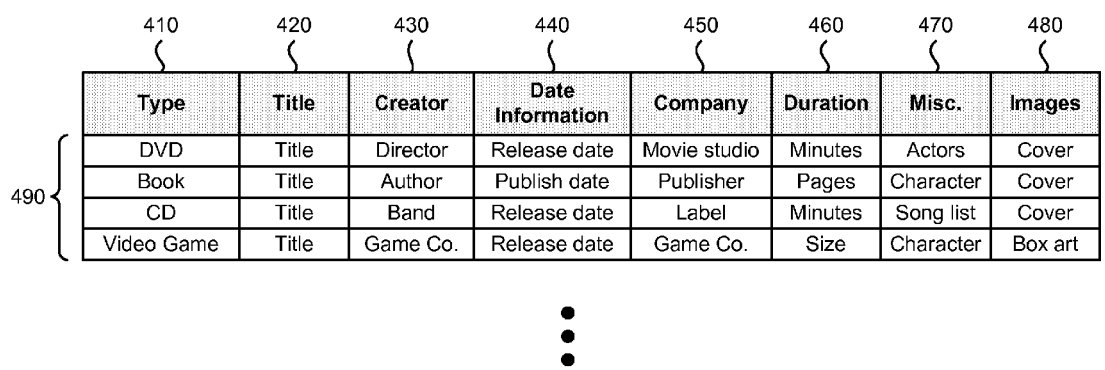

FIG. 4 depicts a portion 400 of an exemplary personal inventory database capable of being provided in and/or managed by user device 110 and/or personal inventory server 120. In one implementation, the information provided in database portion 400 may be manually provided by a user of user device 110. In another implementation, the information provided in database portion 400 may be automatically provided by personal inventory 150 (e.g., via a barcode, a product code associated with purchase 150, a stock keeping unit (SKU) associated with product 150, and/or other product identification mechanisms). In one exemplary implementation, the personal inventory database may include a relational and/or a structured query language (SQL) based database.

As illustrated, database portion 400 may include a variety of personal inventory information. For example, database portion 400 may include a type field 410, a title field 420, a creator field 430, a date information field 440, a company field 450, a duration field 460, a miscellaneous field 470, an images field 480, and/or a variety of records or entries 490 associated with fields 410-480.

Type field 410 may include types of personal inventory owned, tracked, managed, etc. by a user of user device 110. For example, type field 710 may include entries 490 for a DVD, a book, a CD, a video game, etc. Title field 420 may include a title or name associated with the personal inventory types provided in type field 410. For example, title field 420 may include titles for the DVD (e.g., a movie title), the book (e.g., a book title), the CD (e.g., an album title), the video game (e.g., a video game title), etc. provided in type field 410.

Creator field 430 may include information associated with a creator of the personal inventory types provided in type field 410. For example, creator field 430 may indicate that the DVD provided in type field 410 was created by a particular director, that the book provided in type field 410 was created by a particular author, that the CD provided in type field 410 was created by a particular artist, and that the video game provided in type field 410 was created by a particular game publisher or company. Date information field 440 may include information associated with dates when the personal inventory types provided in type field 410 were made available for purchase. For example, date information field 440 may provide release dates for the DVD, the CD, and the video game provided in type field 410, and may provide a publication date for the book provided in type field 410.

Company field 450 may include information associated with a company that offers the personal inventory types provided in type field 410. For example, company field 450 may indicate that a movie studio offers the DVD provided in type field 410, a publisher offers the book provided in type field 410, a record label offers the CD provided in type field 410, and a game company offers the video game provided in type field 410. Duration field 460 may include information associated with a length of time (or other unit of measure) of the personal inventory types provided in type field 410. For example, duration field 460 may indicate that the DVD provided in type field 410 lasts a specified number of minutes, that the book provided in type field 410 has a specified number of pages, that the CD provided in type field 410 lasts a specified number of minutes, and that the video game provided in type field 410 has a certain file size.

Miscellaneous field 470 may include miscellaneous information associated with the personal inventory types provided in type field 410. For example, miscellaneous field 470 may indicate that certain actors appear in the DVD provided in type field 410, that certain characters appear in the book and/or the video game provided in type field 410, and that a song list appears in the CD provided in type field 410. Images field 480 may include image information associated with the personal inventory types provided in type field 410. For example, images field 480 may include a cover image of the DVD, the book, and/or the CD provided in type field 410, and box art of the video game provided in type field 410. In one implementation, the images provided in images field 480 may be retrieved from online databases (e.g., the Internet Movie Database (IMDb), Amazon.com, etc.) accessible via network 130.

Although FIG. 4 shows exemplary information that may be provided in database portion 400, in other implementations, database portion 400 may contain fewer, different, or additional information than depicted in FIG. 4. For example, database portion 400 may include additional fields, such as a synopsis field, a personal rating field, an industry rating field, a genre field, etc. In one implementation, based on the content of database portion 400, the personal inventory manager described herein may cross-reference libraries (e.g., between users of the personal inventory manager and their personal ratings of various personal inventory items) to make suggestions relating to possible future purchases. By integrating this "recommendation" feature on user device 110, the provider of the personal inventory manager may become involved in point-of-purchase sales and may derive referral fees or other benefits from participating retailers, publishers, etc.

FIG. 5 depicts a portion 500 of an exemplary personal inventory database capable of being provided in and/or managed by user device 110 and/or personal inventory server 120. In one implementation, the information provided in database portion 500 may be manually provided by a user of user device 110. In another implementation, the information provided in database portion 500 may be automatically provided by personal inventory 150 (e.g., via a barcode, a product code associated with purchase 150, a stock keeping unit (SKU) associated with product 150, and/or other product identification mechanisms). In one exemplary implementation, the personal inventory database may include a relational and/or a structured query language (SQL) based database (e.g., of personal inventory that has been loaned to someone).

As illustrated, database portion 500 may include a variety of information associated with personal inventory that has been loaned, could be loaned, etc. to others (e.g., friends, family, etc.). For example, database portion 500 may include a media field 510, a checkout date field 520, a checkin date field 530, a length field 540, a borrower name field 550, an images field 560, a title field 570, a loan status field 580, and/or a variety of entries 590 associated with fields 510-580.

Media field 510 may include a description of personal inventory loaned by a user of user device 110 to another person (e.g., a friend). For example, media field 510 may include entries 590 for a DVD, a book, a CD, a video game, etc. Checkout date field 520 may include information associated with dates when the personal inventory provided in media field 510 was loaned. For example, checkout date field 520 may provide checkout dates (e.g., Nov. 1, 2007, Oct. 1, 2007, etc.) for the DVD, the book, the CD, and the video game provided in media field 510.

Checkin date field 530 may include information associated with dates when the loaned personal inventory provided in media field 510 was returned to the user of user device 110. For example, checkin date field 530 may provide checkin dates (e.g., Nov. 15, 2007, Nov. 30, 2007, and Oct. 30, 2007) for the DVD, the CD, and the video game provided in media field 510, and may indicate that the book provided in media field 510 was not returned to the user of user device 110. Length field 540 may include information associated with a length of time (or other unit of measure) of the loaned personal inventory provided in media field 510. For example, length field 540 may indicate that the DVD provided in media field 510 is two hours long, that the book provided in media field 510 is fifty pages, that the CD provided in media field 510 is one hour long, and that the video game provided in media field 510 does not have a length associated with it (e.g., as indicated by a "N/A" or not applicable designation).

Borrower name field 550 may include information associated with friends, family, etc. that borrowed the personal inventory provided in media field 510. For example, borrower name field 550 may indicate that the DVD provided in media field 510 was borrowed by Joe, that the book provided in media field 510 was borrowed by Amy, that the CD provided in media field 510 was borrowed by Tom, and that the video game provided in media field 510 was borrowed by Fred. Images field 560 may include image information associated with the loaned personal inventory provided in media field 510. For example, images field 560 may include a cover image of the DVD, the book, and/or the CD provided in media field 510, and box art of the video game provided in media field 510. In one implementation, the images provided in images field 560 may be retrieved from online databases (e.g., the IMDb) accessible via network 130.

Title field 570 may include a title or name associated with the loaned personal inventory provided in media field 510. For example, title field 570 may include titles for the DVD (e.g., a movie title), the book (e.g., a book title), the CD (e.g., an album title), the video game (e.g., a video game title), etc. provided in media field 510. Loan status field 580 may include loan status information associated with the loaned personal inventory provided in media field 510. For example, loan status field 580 may indicate that the DVD, the CD, and the video game provided in media field 510 have been returned (e.g., as indicated by a "N/A" designation), and that the book provided in media field 510 has not been returned (e.g., as indicated by a "Problem" designation). In one implementation, loan status field 580 may be used to provide alarms to the user of user device 110 if loaned personal inventory has not been returned.

Although FIG. 5 shows exemplary information that may be provided in database portion 500, in other implementations, database portion 500 may contain fewer, different, or additional information than depicted in FIG. 5. In one implementation, based on the content of database portion 500, the personal inventory manager described herein may permit users to track their loaned personal inventory.

FIGS. 6, 7, and 9-14 illustrate exemplary user interfaces capable of being displayed by user device 110 (e.g., via the personal inventory manager described herein). The user interfaces depicted in FIGS. 6, 7, and 9-14 (collectively referred to as "the user interfaces"), may enable a user to interact with the personal inventory manager, and may include a graphical user interface (GUI) or a non-graphical user interface, such as a text-based interface. The user interfaces may provide information to users via a customized interface (e.g., a proprietary interface) and/or other types of interfaces (e.g., a browser-based interface). The user interfaces may receive user inputs via one or more input devices (e.g., input device 260), may be user configurable (e.g., a user may change the size of the user interfaces, information displayed in the user interfaces, color schemes used by the user interfaces, positions of text, images, icons, windows, etc., in the user interfaces, etc.), and/or may not be user configurable. The user interfaces may be displayed to a user via one or more output devices (e.g., output device 270).

Figure 6:
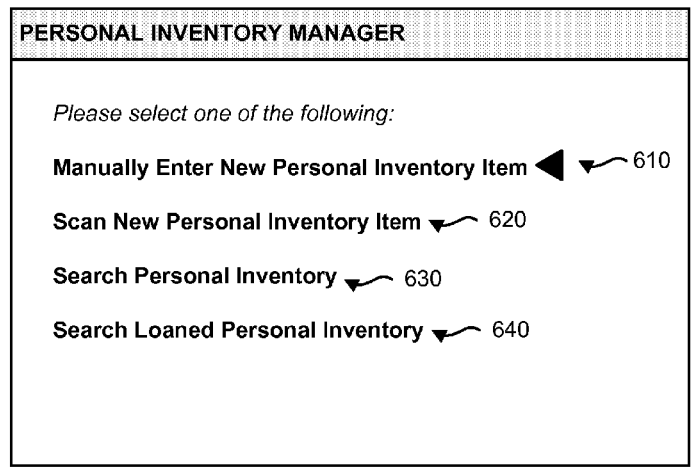
FIG. 6 illustrates an exemplary user interface capable of being displayed by the user device of the network illustrated in FIG. 1, and displaying a personal inventory manager.

FIG. 6 depicts an exemplary user interface 600 that displays a main screen for the personal inventory manager. As illustrated, user interface 600 may include two personal inventory input options (e.g., a manually enter new personal inventory item option 610 and a scan a new personal inventory item option 620), a search personal inventory option 630, and/or a searched loaned personal inventory option 640. Options 610-640 may be selected by a user of user device 110 (e.g., via display 320 (e.g., a touch screen display), control buttons 330, and/or keypad 340).

If the user selects manually enter new personal inventory item option 610, user device 110 may display an exemplary user interface 700, as depicted in FIG. 7. As illustrated in FIG. 7, user interface 700 may instruct the user to input information for a new personal inventory item, and may include a type input mechanism 710, a title input mechanism 720, a creator input mechanism 730, a data input mechanism 740, a company input mechanism 750, a duration input mechanism 760, a miscellaneous input mechanism 770, an images input mechanism 780, and/or a storage selection mechanism 790.

In one implementation, input mechanisms 710-780 may include input fields for inputting descriptive information (e.g., type, title, creator, date, company, duration, miscellaneous, images, etc.) associated with a new personal inventory item. In another implementation, input mechanisms 710-780 may include drop-down menus for selecting descriptive information (e.g., type, title, creator, date, company, duration, miscellaneous, images, etc.) associated with a new personal inventory item from a list of personal inventory information.

Alternatively and/or additionally, a user may manually input the information associated with the new personal inventory item via a desktop or web-based application (e.g., provided on a laptop, a personal computer, personal inventory server 120, etc.), a data service, online databases, etc. User device 110 may retrieve the manually entered information via a network (e.g., network 130).

Storage selection mechanism 790 may include a mechanism (e.g., a button, an icon, a link, etc.) that, if selected (e.g., with a selection mechanism), may enable user device 110 to store information provided by user interface 700 in a personal inventory database (e.g., provided in user device 110 and/or personal inventory server 120).

Figure 8:
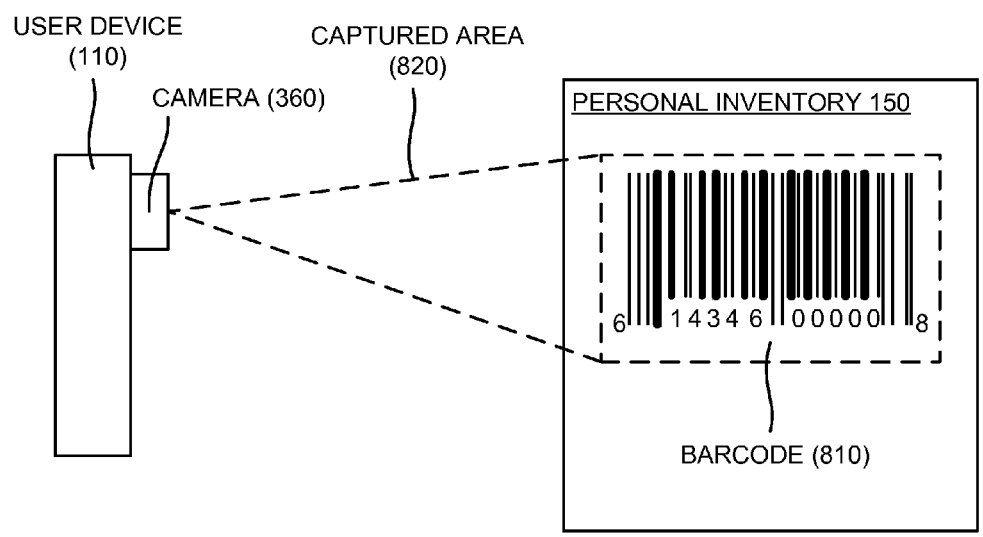
FIG. 8 illustrates a diagram of exemplary interactions between the user device of the network depicted in FIG. 1 and personal inventory.

Returning to FIG. 6, if the user selects scan new personal inventory item option 620, user device 110 may instruct the user to capture (e.g., with camera 360 of user device 110) a barcode associated with the new personal inventory item. FIG. 8 illustrates a diagram of exemplary interactions between user device 110 and personal inventory 150 during a barcode capturing operation. As illustrated, personal inventory 150 may include a barcode 810 that is capable of being captured within a captured area 820 generated by camera 360 of user device 110.

Barcode 810 may include a Universal Product Code (UPC) barcode (e.g. a barcode that may fit twelve digits into a compact space), a European Article Number (EAN) barcode (e.g., a barcode that may be used worldwide for marking retail goods), a "code 39" barcode (e.g., a barcode that may include letters and numbers, and may be used for identification, inventory, and/or tracking purposes in various industries), a "code 128" barcode (e.g., a barcode that may provide a wider selection of characters, may be compact, and may include a dense symbol), an "interleaved 2 of 5" symbology (e.g., a compact symbology which may be used for shipping boxes), a "postnet" barcode (e.g., a symbology that may encode zip codes for processing mail), a "PDF417" barcode (e.g., a two-dimensional barcode that may be a portable data file (PDF)), etc. In one implementation, barcode 810 may encode information associated with personal inventory 150 (e.g., personal inventory information 140).

User device 110 may include a barcode reader application that interacts with camera 360 of user device 110 to capture images of barcodes (e.g., barcode 810). The barcode reader application may analyze an image of a barcode and may interpret the barcode image into an actual value (e.g., a UPC value). The barcode reader application may analyze a skew of a barcode to provide an indication of accuracy of the captured image. User device 110 may also use an optical character recognition (OCR) application to check digits provided in a captured barcode image and to verify the accuracy of the interpreted barcode image. The OCR application may act as redundant accuracy check for the barcode reader application. As further shown in FIG. 8, camera 360 may capture an image associated with captured area 820 (e.g., which may include barcode 810), and user device 110 may analyze the captured image with the barcode reader application and/or the OCR application. User device 110 may also display the captured image of barcode 810 (e.g., on display 320).

User device 110 (e.g., using the barcode reader application and/or the OCR application) may extract information associated with barcode 810. In one implementation, user device 110 may extract personal inventory information 140 from the captured image of barcode 810. For example, user device 110 may extract information, such as a type of personal inventory 150, a title of personal inventory 150, a creator of personal inventory 150, a date of personal inventory 150, a duration of personal inventory 150, etc.

Figure 9:
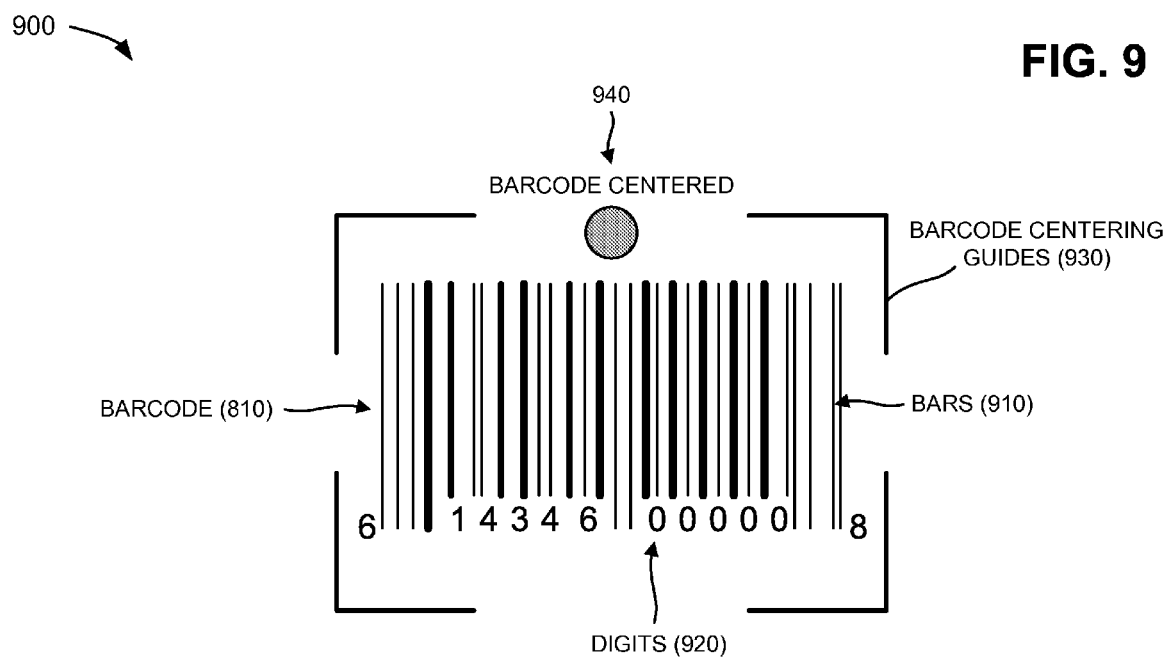
FIG. 9 depicts an exemplary user interface capable of being displayed by the user device of the network illustrated in FIG. 1, and displaying a barcode associated with the personal inventory shown in FIG. 8.

FIG. 9 depicts an exemplary user interface 900 capable of being displayed by user device 110 (e.g., on display 320) if a barcode image is captured. As illustrated, user interface 900 may display the captured image of barcode 810 associated with personal inventory 150, and may further display bars 910 and digits 920 of barcode 810, barcode centering guides 930, and an indicator 940 of whether barcode 810 is centered.

Bars 910 and spaces between bars 910 may encode a sequence (e.g., a seven-bit sequence in UPC barcodes) that may be interpreted by the barcode reader application provided in user device 110. The barcode reader application provided in user device 110 may analyze bars 910 (and spaces between bars 910) and a skew of the captured image of barcode 810. The barcode reader application may interpret bars 910 (and spaces between bars 910) into information associated with personal inventory 150 (e.g., personal inventory information 140). If personal inventory information 140 is extracted from the captured image of barcode 810, the image may be discarded to avoid a need for storage space for archiving barcode images.

Bars 910 and spaces between bars 910 may provide a visual representation of digits 920 of barcode 810. The OCR application provided in user device 110 may interpret digits 920 into information associated with personal inventory 150 (e.g., personal inventory information 140). User device 110 may compare the results obtained by the barcode reader application and the OCR application to ensure that accurate personal inventory information 140 is retrieved.

Barcode centering guides 930 (e.g., provided by the barcode reader application) may provide alignment or registration marks at four corners of barcode 810 to help a user of user device 110 to center the image of barcode 810 (e.g., using camera 360). Indicator 940 may provide a visual indication that proper alignment of barcode 810 is achieved (e.g., a green light may indicate that barcode 810 is aligned, a red light may indicate that barcode is not aligned, etc.). In other implementations, an audio or an audio/visual indicator may be used for aligning barcode 810 with user device 110.

FIG. 10 illustrates an exemplary user interface 1000 capable of being displayed by user device 110 after user device 110 has captured and interpreted information associated with barcode 810 (e.g., personal inventory information 140). As illustrated, user interface 1000 may include a type field 1010, a title field 1020, a creator field 1030, a date field 1040, a company field 1050, a duration field 1060, a miscellaneous field 1070, an images field 1080, and/or a storage selection mechanism 1090. In one implementation, information associated with barcode 810 may be used to query and/or retrieve information relating to the personal inventory item that was scanned. For example, user device 110 may retrieve such information via network 130.

Type field 1010 may include a type associated with the new personal inventory item scanned by user device 110. For example, type field 1010 may indicate that the new personal inventory item is a DVD. Title field 1020 may include a title or name associated with the new personal inventory item type provided in type field 1010. For example, title field 1020 may include a movie title for the DVD provided in type field 1010.

Creator field 1030 may include information associated with the new personal inventory item type provided in type field 1010. For example, creator field 1030 may indicate that the DVD provided in type field 1010 was created by a director. Date information field 1040 may include information associated with dates when the new personal inventory item type provided in type field 1010 was available for sale. For example, date information field 1040 may provide a release date for the DVD provided in type field 1010.

Company field 1050 may include information associated with a company that offers the new personal inventory item type provided in type field 1010. For example, company field 1050 may indicate that a movie studio offers the DVD provided in type field 1010. Duration field 1060 may include information associated with a length of time of the new personal inventory item type provided in type field 1010. For example, duration field 1060 may indicate that the DVD provided in type field 1010 lasts two hours.

Miscellaneous field 1070 may include miscellaneous information associated with the new personal inventory item type provided in type field 1010. For example, miscellaneous field 1070 may indicate that certain actors appear in the DVD provided in type field 1010. Images field 1080 may include image information associated with the new personal inventory item type provided in type field 1010. For example, images field 1080 may include a cover image of the DVD provided in type field 1010.

Storage selection mechanism 1090 may include a mechanism (e.g., a button, an icon, a link, etc.) that, if selected (e.g., with a selection mechanism), may enable user device 110 to store information provided by user interface 1000 in a personal inventory database (e.g., provided in user device 110 and/or personal inventory server 120).

In one exemplary implementation, user device 110 may display user interfaces 700, 900, and/or 1000 in order to receive and/or store updated information associated with personal inventory already provided in the personal inventory database (i.e., rather than inputting new personal inventory items). Such an arrangement may enable the user of user device 110 to check in a personal inventory item when it is returned, check out a personal inventory item when it is loaned to someone, etc.

Returning to FIG. 6, if the user selects search personal inventory option 630, user device 110 may display an exemplary user interface 1100, as depicted in FIG. 11. As illustrated in FIG. 11, user interface 1100 may instruct the user to select a means by which to search personal inventory, and may include a media type selection 1110, a title selection 1120, a genre selection 1130, a personal rating selection 1140, an industry rating selection 1150, an author and/or director selection 1160, and/or a series selection 1170.

Media type selection 1110 may be selected by a user of user device 110 (e.g., via display 320, control buttons 330, and/or keypad 340), and may permit the user to search personal inventory based on media type (e.g., DVD, book, CD, video game, etc.). Title selection 1120 may be selected by a user of user device 110 (e.g., via display 320, control buttons 330, and/or keypad 340), and may permit the user to search personal inventory based on title (e.g., movie title, book title, CD title, video game title, etc.).

Genre selection 1130 may be selected by a user of user device 110 (e.g., via display 320, control buttons 330, and/or keypad 340), and may permit the user to search personal inventory based on genre (e.g., action, adventure, comedy, etc.). Personal rating selection 1140 may be selected by a user of user device 110 (e.g., via display 320, control buttons 330, and/or keypad 340), and may permit the user to search personal inventory based on personal ratings (e.g., ratings provided by the user of user device 110). For example, in one implementation, the user may provide a rating mechanism (e.g., three stars out of five stars, five stars out or five stars, etc.) that rates the personal inventory.

Industry rating selection 1150 may be selected by a user of user device 110 (e.g., via display 320, control buttons 330, and/or keypad 340), and may permit the user to search personal inventory based on industry ratings (e.g., ratings provided by critics of movies, books, music, etc.). For example, in one implementation, the user may input rating mechanisms (e.g., three stars out of five stars, five stars out or five stars, etc.) provided by the critics.

Author/director selection 1160 may be selected by a user of user device 110 (e.g., via display 320, control buttons 330, and/or keypad 340), and may permit the user to search personal inventory based on an author/director (e.g., a movie made by a certain director, a book written by a certain author, etc.). Series selection 1170 may be selected by a user of user device 110 (e.g., via display 320, control buttons 330, and/or keypad 340), and may permit the user to search personal inventory based on a series (e.g., season one of a television series, episode two of movie, etc.).

If the user selects one of selections 1110-1170 provided by user interface 1100 (e.g., such as media type selection 1110), an exemplary user interface 1200, as depicted in FIG. 12, may be displayed by user device 110. As illustrated in FIG. 12, user interface 1200 may include a listing of personal inventory associated with the selected selection (e.g., a media type, such as CDs). User interface 1200 may include a type field 1210, a title field 1220, a creator field 1230, a date field 1240, a company field 1250, an images field 1260, etc. which may correspond to information provided in type field 410, title field 420, creator field 430, date information field 440, company field 450, images field 480, etc. provided in database portion 400 (FIG. 4) of the personal inventory database, but sorted based on the selected media type (e.g., based on CDs).

Returning to FIG. 6, if the user selects search loaned personal inventory option 640, user device 110 may display an exemplary user interface 1300, as depicted in FIG. 13. As illustrated in FIG. 13, user interface 1300 may instruct the user to select a means by which to search loaned personal inventory, and may include a media type selection 1310, a borrower selection 1320, a title selection 1330, and/or a longest outstanding loan selection 1340.

Media type selection 1310 may be selected by a user of user device 110 (e.g., via display 320, control buttons 330, and/or keypad 340), and may permit the user to search loaned personal inventory based on media type (e.g., DVD, book, CD, video game, etc.). Borrower selection 1310 may be selected by a user of user device 110 (e.g., via display 320, control buttons 330, and/or keypad 340), and may permit the user to search loaned personal inventory based on who (e.g., a friend, a family member, a neighbor, etc.) borrowed the personal inventory.

Title selection 1330 may be selected by a user of user device 110 (e.g., via display 320, control buttons 330, and/or keypad 340), and may permit the user to search loaned personal inventory based on title (e.g., movie title, book title, CD title, video game title, etc.). Longest outstanding loan selection 1340 may be selected by a user of user device 110 e.g., via display 320, control buttons 330, and/or keypad 340), and may permit the user to search loaned personal inventory based on who (e.g., a friend, a family member, a neighbor, etc.) borrowed the personal inventory the longest amount of time. In one implementation, user device 110 may display a list of loaned personal inventory that may be ranked based on how long the loaned personal inventory has been borrowed (or checked out).

If the user selects one of selections 1310-1340 provided by user interface 1100 (e.g., such as media type selection 1310), an exemplary user interface 1400, as depicted in FIG. 14, may be displayed by user device 110. As illustrated in FIG. 14, user interface 1400 may include a listing of loaned personal inventory associated with the selected selection (e.g., a media type, such as DVDs). User interface 1400 may include a media field 1410, a checkout date field 1420, a checkin date field 1430, a title field 1440, a borrower field 1450, etc. which may correspond to information provided in media field 510, checkout date field 520, checkin date field 530, title field 570, borrower name field 550, etc. provided in database portion 500 (FIG. 5) of the personal inventory database, but sorted based on the selected media type (e.g., based on DVDs).

Although FIGS. 6, 7, and 9-14 show exemplary elements of user interfaces 600, 700, and 900-1400, in other implementations, user interfaces 600, 700, and 900-1400 may contain fewer, different, or additional elements than depicted in FIGS. 6, 7, and 9-14.

FIGS. 15-19 depict flow charts of an exemplary process 1500 for inputting, managing, and tracking personal inventory using user device 110 according to implementations described herein. In one implementation, process 1500 may be performed by user device 110. In another implementation, some or all of process 1500 may be performed by another device or group of devices, including or excluding user device 110. For example, some or all of process 1500 may be performed by personal inventory server 120.

Figure 15:
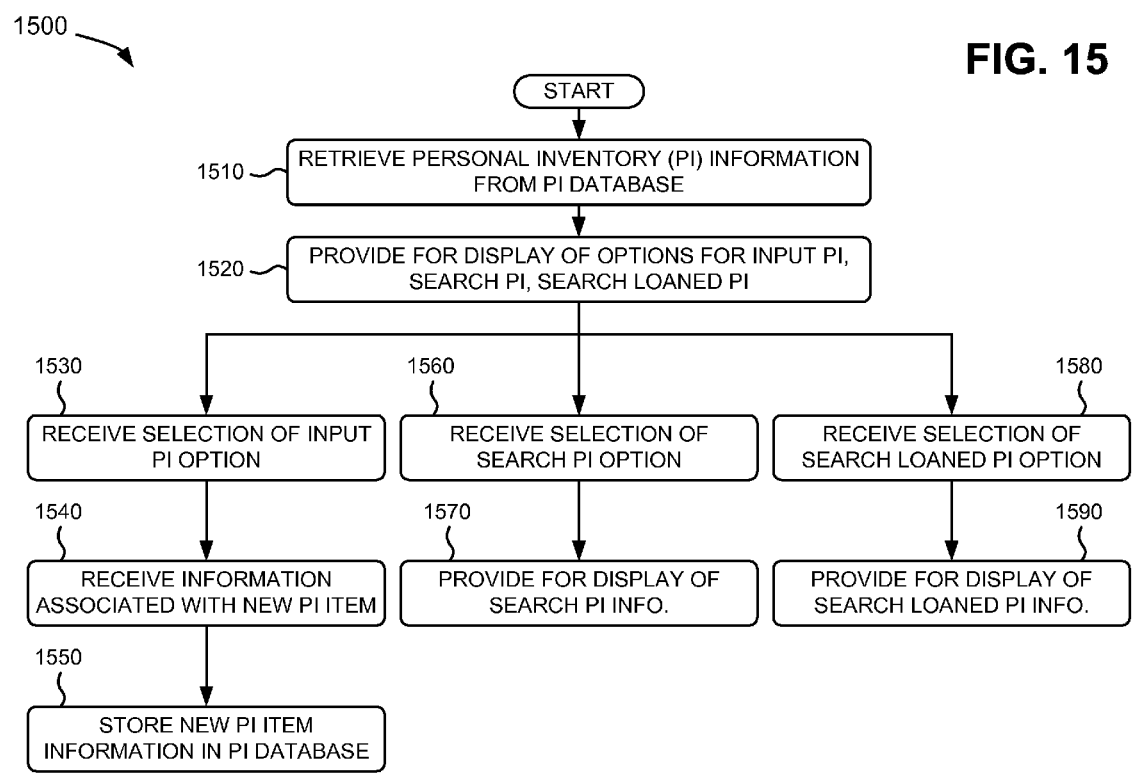
FIGS. 15-19 depict flow charts of an exemplary process according to implementations described herein.

As illustrated in FIG. 15, process 1500 may begin with retrieval of personal inventory (PI) information from a personal inventory database (block 1510), and providing for display of an input personal inventory option, a search personal inventory option, and a search loaned personal inventory option (block 1520). For example, in implementations described above in connection with FIG. 1, the user of user device 110 may access personal inventory information 140 from the personal inventory database, and user device 110 may display selectable options associated with the personal inventory database. In one example, user device 110 may display an input personal inventory option, a search personal inventory option, a search loaned personal inventory option, etc.

Returning to FIG. 15, if a user selects the input personal inventory option, selection of the input personal inventory option may be received (block 1530), information associated with a new personal inventory item may be received (block 1540), and the new personal inventory item information may be stored in the personal inventory database (block 1550). For example, in implementations described above in connection with FIGS. 1, 6, and 7, user interface 600 (e.g., displayed by user device 110) may include two personal inventory input options (e.g., manually enter new personal inventory item option 610 and scan a new personal inventory item option 620). If the user selects manually enter new personal inventory item option 610, user device 110 may display user interface 700, which may instruct the user to input information for a new personal inventory item. If the user selects scan new personal inventory item option 620, user device 110 may instruct the user to capture (e.g., with camera 360 of user device 110) a barcode associated with the new personal inventory item. User device 110 may receive the manually entered and/or scanned information associated with the new personal inventory item, and may store the new personal inventory item information in the personal inventory database.

As further shown in FIG. 15, if a user selects the search personal inventory option, selection of the search personal inventory option may be received (block 1560), and search personal inventory information may be provided for display (block 1570). For example, in implementations described above in connection with FIGS. 6 and 11, if the user selects search personal inventory option 630, user device 110 may display user interface 1100, which may instruct the user to select a means by which to search personal inventory (e.g., based on media type, title, genre, personal rating, industry rating, author/director selection, series, etc.).

Returning to FIG. 15, if a user selects the search loaned personal inventory option, selection of the search loaned personal inventory option may be received (block 1580), and search loaned personal inventory information may be provided for display (block 1590). For example, in implementations described above in connection with FIGS. 6 and 13, if the user selects search loaned personal inventory option 640, user device 110 may display user interface 1300, which may instruct the user to select a means by which to search loaned personal inventory (e.g., based on media type, borrower, title, longest outstanding loan, etc.).

Figure 16:
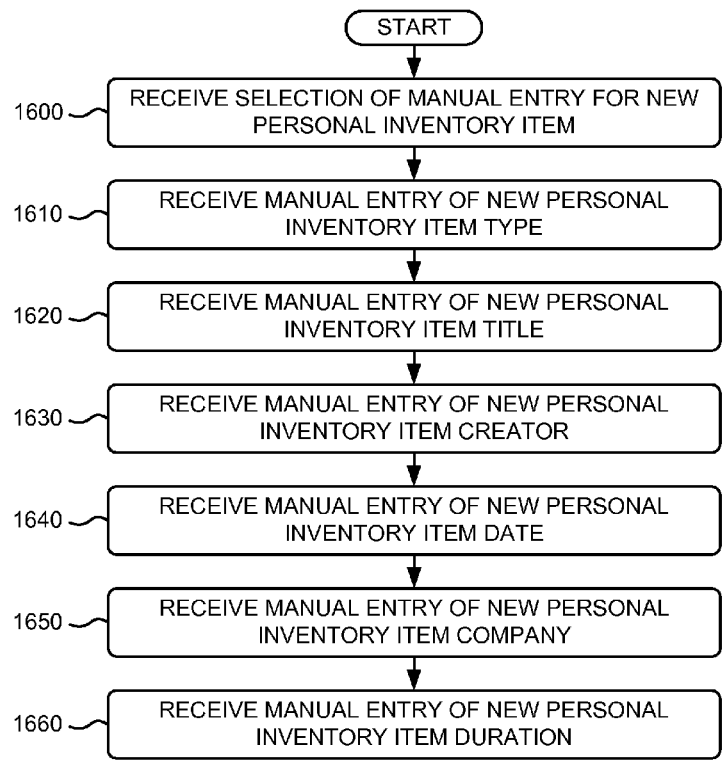

Process block 1540 may include the process blocks illustrated in FIG. 16. As shown in FIG. 16, process block 1540 may include receiving selection of manual entry for the new personal inventory item (block 1600), and one or more of receiving manual entry of a new personal inventory type (block 1610), receiving manual entry of a new personal inventory title (block 1620), receiving manual entry of a new personal inventory creator (block 1630), receiving manual entry of a new personal inventory date (block 1640), receiving manual entry of a new personal inventory company (block 1650), and/or receiving manual entry of a new personal inventory duration (block 1660). For example, in implementations described above in connection with FIGS. 6 and 7, if the user selects manually enter new personal inventory item option 610, user device 110 may display user interface 700, which may instruct the user to input information for a new personal inventory item, and may include type input mechanism 710, title input mechanism 720, creator input mechanism 730, data input mechanism 740, company input mechanism 750, duration input mechanism 760, miscellaneous input mechanism 770, and/or images input mechanism 780. In one example, input mechanisms 710-780 may include input fields for inputting descriptive information (e.g., type, title, creator, date, company, duration, miscellaneous, images, etc.) associated with a new personal inventory item. In another example, input mechanisms 710-780 may include drop-down menus for selecting descriptive information associated with a new personal inventory item from a list of personal inventory information.

Figure 17:
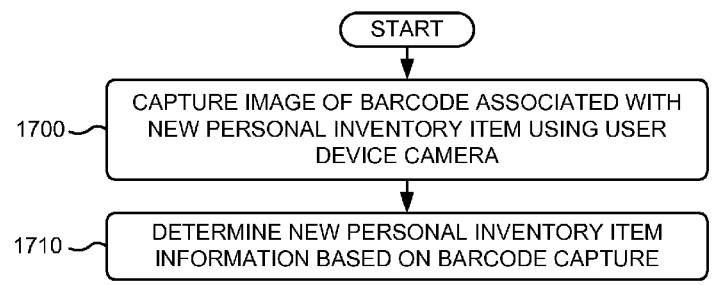

Alternatively and/or additionally, process block 1540 may include the process blocks illustrated in FIG. 17. As shown in FIG. 17, process block 1540 may include capturing an image of a barcode associated with the new personal inventory item using a user device camera (block 1700), and determining the new personal inventory item information based on the barcode capture (block 1710). For example, in implementations described above in connection with FIG. 8, user device 110 may include a barcode reader application that interacts with camera 360 of user device 110 to capture images of barcodes (e.g., barcode 810). The barcode reader application may analyze an image of a barcode and may interpret the barcode image into an actual value (e.g., a UPC value). User device 110 may also use an OCR application to check digits provided in a captured barcode image and to verify the accuracy of the interpreted barcode image. User device 110 (e.g., using the barcode reader application and/or the OCR application) may extract information associated with barcode 810, such as personal inventory information 140. As described above, the extracted information associated with barcode 810 may be used by user device 110 to query and retrieve personal inventory information, relating to the scanned item, from a remote resource or device, e.g., via network 130.

Figure 18:
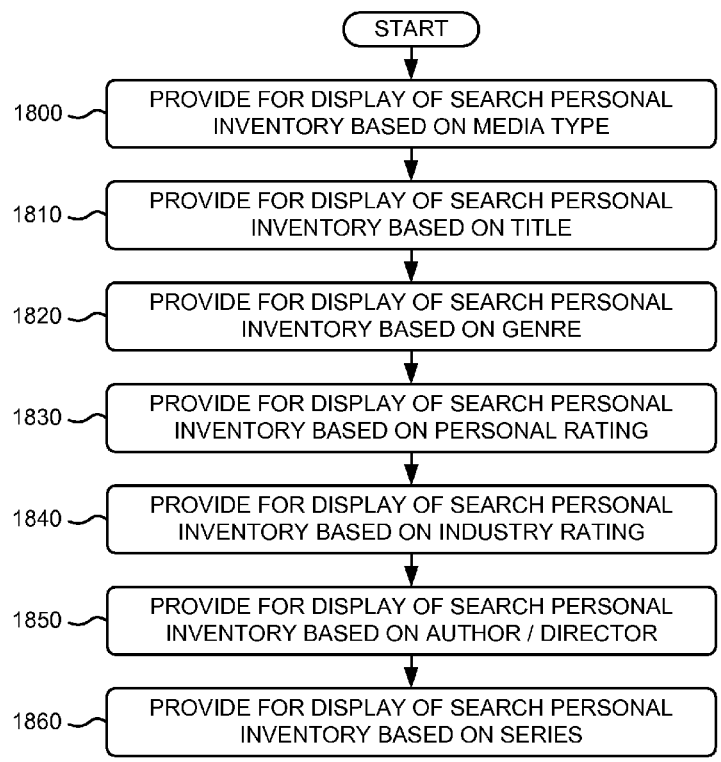

Process block 1570 may include the process blocks illustrated in FIG. 18. As shown in FIG. 18, process block 1570 may include one or more of providing for display of search personal inventory based on a media type (block 1800), providing for display of search personal inventory based on a title (block 1810), providing for display of search personal inventory based on genre (block 1820), providing for display of search personal inventory based on personal rating (block 1830), providing for display of search personal inventory based on industry rating (block 1840), providing for display of search personal inventory based on an author or director (block 1850), and/or providing for display of search personal inventory based on a series (block 1860). For example, in implementations described above in connection with FIG. 11, user interface 1100 may instruct the user to select a means (e.g., selections 1110-1170) by which to search personal inventory. Selections 1110-1170 may be selected by a user of user device 110 (e.g., via display 320, control buttons 330, and/or keypad 340), and may permit the user to search personal inventory based on media type (e.g., media type selection 1110), title (e.g., title selection 1120), genre (e.g., genre selection 1130), personal rating (e.g., personal rating selection 1140), industry rating (e.g., industry rating selection 1150), author or director (e.g., author/director selection 1160), and/or series (e.g., series selection 1170).

Figure 19:
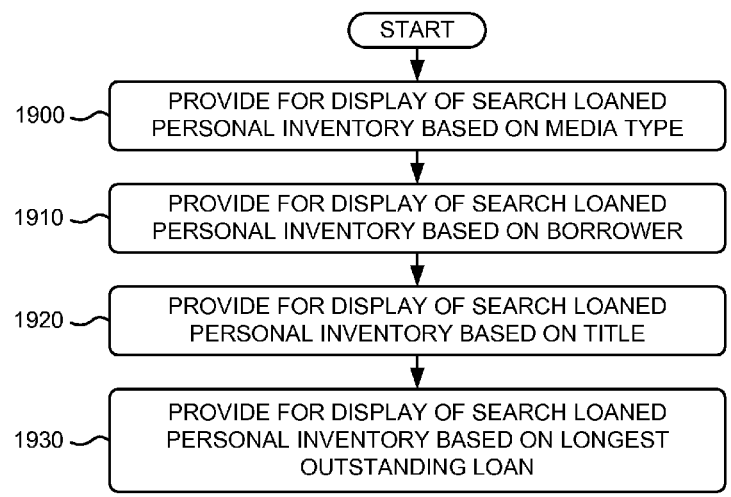

Process block 1590 may include the process blocks illustrated in FIG. 19. As shown in FIG. 19, process block 1590 may include one or more of providing for display of search loaned personal inventory based on a media type (block 1900), providing for display of search loaned personal inventory based on a borrower (block 1910), providing for display of search loaned personal inventory based on title (block 1920), and/or providing for display of search loaned personal inventory based on longest outstanding loan (block 1930). For example, in implementations described above in connection with FIG. 13, user interface 1300 may instruct the user to select a means (e.g., selections 1310-1340) by which to search loaned personal inventory. Selections 1310-1340 may be selected by a user of user device 110 (e.g., via display 320, control buttons 330, and/or keypad 340), and may permit the user to search loaned personal inventory based on media type (e.g., media type selection 1310), borrower (e.g., borrower selection 1320), title (e.g., title selection 1330), and/or longest outstanding loan (e.g., longest outstanding loan selection 1340).

Implementations described herein may permit input to, manage, and track personal inventory items using a user device. The personal inventory may be recorded in a personal inventory database that may include user-definable information associated with the personal inventory. The user or customer may search the user-definable information using a display of the user device, and may input information associated with new personal inventory items to be recorded in the personal inventory database. The customer may use the personal inventory information contained in the personal inventory database to prevent duplicate purchases at point-of-purchase locations. The personal inventory manager and/or database may also be used to track loaned personal inventory to determine who has what personal inventory and for how long. The personal inventory manager and/or database may provide a user with "at-a-glance" information about their personal inventory from the convenience of a hand-held device, such as a cellular phone.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 15-19, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A mobile communications device-implemented method, comprising:

retrieving, by the mobile communications device, information associated with a personal inventory stored in a personal inventory database and associated with a user of the mobile communications device;

retrieving, by the mobile communications device, additional information, where the additional information is associated with another personal inventory stored in the personal inventory database, and where the other personal inventory is associated with another user who is associated with another communications device;

providing the mobile communications device and to the user, a recommendation for purchasing a new personal inventory item based on the retrieved information and the retrieved additional information;

displaying, by the mobile communications device, an input personal inventory option, a search personal inventory option, and a search loaned personal inventory option based on the retrieved personal inventory information;

receiving, by the mobile communications device, a selection of one of the input personal inventory option, the search personal inventory option, or the search loaned personal inventory option;

receiving, by the mobile communications device, information associated with the new personal inventory item in response to the input personal inventory option being selected;

displaying, by the mobile communications device, search personal inventory information in response to the search personal inventory option being selected; and displaying, by the mobile communications device, search loaned personal inventory information in response to the search loaned personal inventory option being selected.

2. The mobile communications device-implemented method of claim 1, further comprising:
storing the new personal inventory item information in the personal inventory database in response to the input personal inventory option is selected.

3. The mobile communications device-implemented method of claim 1, where receiving information associated with the new personal inventory item comprises:
receiving selection of an option to manually input the new personal inventory item information;
receiving input of a type for the new personal inventory item;
receiving input of a title of the new personal inventory item;
receiving input of a creator of the new personal inventory item;
receiving input of a date associated with the new personal inventory item;
receiving input of a company associated with the new personal inventory item; and
receiving input of a duration of the new personal inventory item.

4. The mobile communications device-implemented method of claim 1, where receiving information associated with the new personal inventory item comprises:
capturing an image of a barcode associated with the new personal inventory item using a camera of the mobile communications device; and
determining the new personal inventory item information based on the captured image of the barcode.

5. The mobile communications device-implemented method of claim 1, where displaying the search personal inventory information comprises at least one of:
displaying the search personal inventory based on media type;
displaying the search personal inventory based on title;
displaying the search personal inventory based on genre;
displaying the search personal inventory based on personal rating;
displaying the search personal inventory based on industry rating;
displaying the search personal inventory based on author or director; or
displaying the search personal inventory based on series.

6. The mobile communications device-implemented method of claim 1, where displaying the search loaned personal inventory information further comprises at least one of:
displaying the search loaned personal inventory based on media type;
displaying the search loaned personal inventory based on borrower;
displaying the search loaned personal inventory based on title; or
displaying the search loaned personal inventory based on longest outstanding loan.

7. The mobile communications device-implemented method of claim 6, where displaying the search loaned personal inventory based on longest outstanding loan comprises:
displaying a ranked list of one or more loaned personal inventory items recorded in the personal inventory database based on one or more associated loan durations.

8. A computer-readable memory device provided in a mobile communications device, the computer-readable memory device stores computer-executable instructions and comprises:
one or more instructions for retrieving information associated with personal inventory from a personal inventory database associated with a user of the mobile communications device;
one or more instructions for providing for display of an input personal inventory option, a search personal inventory option, and a search loaned personal inventory option based on the retrieved personal inventory information;
one or more instructions for retrieving additional information, where the additional information is associated with another personal inventory stored in the personal inventory database, and where the other personal inventory is associated with another user who differs from the user of the mobile communications device;
one or more instructions for providing a recommendation for purchasing, by the user, a new personal inventory item based on the retrieved information and the retrieved additional information;
one or more instructions for receiving a selection of one of the input personal inventory option, the search personal inventory option, or the search loaned personal inventory option;
one or more instructions for receiving information associated with the new personal inventory item when the input personal inventory option is selected;
one or more instructions for storing the new personal inventory item information in the personal inventory database when the input personal inventory option is selected;
one or more instructions for providing for display of search personal inventory information when the search personal inventory option is selected;
one or more instructions for providing for display of search loaned personal inventory information when the search loaned personal inventory option is selected.

9. The computer-readable memory device of claim 8, where the mobile communications device comprises one of a radiotelephone, a personal communications system (PCS) terminal, a personal digital assistant (PDA), a global positioning system (GPS) device, or a cellular telephone.

10. The computer-readable memory device of claim 8, where the one or more instructions for receiving information associated with the new personal inventory item comprise:
one or more instructions for receiving selection of an option to manually input the new personal inventory item information; and
one or more instructions for receiving user entry of at least one of a type for the new personal inventory item, a title of the new personal inventory item, a creator of the new personal inventory item, a date associated with the new personal inventory item, a company associated with the new personal inventory item, or a duration of the new personal inventory item.

11. The computer-readable memory device of claim 8, where the one or more instructions for receiving information associated with the new personal inventory item comprise:
one or more instructions for capturing an image of a barcode associated with the new personal inventory item using a camera of the mobile communications device; and
one or more instructions for determining the new personal inventory item information based on the captured image of the barcode.

12. The computer-readable memory device of claim 11, where the barcode comprises at least one of a Universal Product Code (UPC) barcode, a European Article Number (EAN) barcode, a code 39 barcode, a code 128 barcode, an interleaved 2 of 5 symbology, a postnet barcode, or a PDF417 barcode.

13. The computer-readable memory device of claim 11, where the barcode encodes the new personal inventory item information.

14. The computer-readable memory device of claim 11, where the one or more instructions for determining the new personal inventory item information comprise:
- one or more instructions for determining the new personal inventory item information with a barcode reader application based on the captured image of the barcode; and
- one or more instructions for determining the new personal inventory item information with an optical character recognition (OCR) application based on the captured image of the barcode.

15. The computer-readable memory device of claim 8, where the personal inventory database comprises at least one of:
- types associated with the personal inventory;
- titles associated with the personal inventory;
- creators associated with the personal inventory;
- date information associated with the personal inventory;
- companies associated with the personal inventory; or
- durations associated with the personal inventory.

16. The computer-readable memory device of claim 8, where the personal inventory database comprises at least one of:
- media associated with the personal inventory;
- checkout dates associated with the personal inventory;
- checkin dates associated with the personal inventory;
- lengths associated with the personal inventory;
- borrowers associated with the personal inventory;
- images associated with the personal inventory; or
- loan status associated with the personal inventory.

17. The computer-readable memory device of claim 8, where, when the search personal inventory option is selected, the computer-readable memory device further comprises at least one of:
- one or more instructions for providing for display of the search personal inventory based on media type;
- one or more instructions for providing for display of the search personal inventory based on title;
- one or more instructions for providing for display of the search personal inventory based on genre;
- one or more instructions for providing for display of the search personal inventory based on personal rating;
- one or more instructions for providing for display of the search personal inventory based on industry rating;
- one or more instructions for providing for display of the search personal inventory based on author or director; or
- one or more instructions for providing for display of the search personal inventory based on series.

18. The computer-readable memory device of claim 8, where, when the search loaned personal inventory option is selected, the computer-readable memory device further comprises at least one of:
- one or more instructions for providing for display of the search loaned personal inventory based on media type;
- one or more instructions for providing for display of the search loaned personal inventory based on borrower;
- one or more instructions for providing for display of the search loaned personal inventory based on title; or
- one or more instructions for providing for display of the search loaned personal inventory based on longest outstanding loan.

19. The computer-readable memory device of claim 8, where the personal inventory database is provided in the mobile communications device.

20. The computer-readable memory device of claim 8, where the personal inventory database is provided in a personal inventory server and is accessed by the mobile communications device.

21. The computer-readable memory device of claim 8, the personal inventory comprises at least one of a digital video disc, a compact disc, a book, a video tape, a video game, a magazine, or a periodical.

* * * * *